United States Patent [19]

Marsh et al.

[11] 4,113,185
[45] Sep. 12, 1978

[54] PROCESS FOR PRODUCING FUEL FROM SOLID WASTE

[75] Inventors: Paul G. Marsh, Hamilton; Dean H. Kohlhepp, Centerville, both of Ohio

[73] Assignee: Black Clawson Fibreclaim, Inc., Middletown, Ohio

[21] Appl. No.: 804,786

[22] Filed: Jun. 8, 1977

[51] Int. Cl.² .............................................. B02C 23/38
[52] U.S. Cl. ........................................ 241/21; 241/24; 241/29; 241/DIG. 38
[58] Field of Search ...................... 241/21, 24, 29, 30, 241/DIG. 38

[56] References Cited
U.S. PATENT DOCUMENTS

| | | | |
|---|---|---|---|
| 3,549,092 | 12/1970 | Baxter | 241/21 |
| 3,595,488 | 7/1971 | Blakley et al. | 241/21 |
| 3,790,091 | 2/1974 | Law et al. | 241/DIG. 38 |
| 3,848,813 | 11/1974 | Stanczyk et al. | 241/24 |
| 3,876,157 | 4/1975 | Mc Intire et al. | 241/21 |
| 3,945,575 | 3/1976 | Marsh | 241/DIG. 38 |

Primary Examiner—Granville Y. Custer, Jr.
Attorney, Agent, or Firm—Biebel, French & Nauman

[57] ABSTRACT

Municipal refuse is treated to produce fuel particularly useful for the operation of a power generating boiler by a process which is characterized by shredding of the as-received material, separation of the light materials prior to pulping of the heavy materials, and ultimate separation from the pulped materials of the inorganic constituents, after which the remaining slurry of predominantly organic materials is dewatered to produce a particulate fuel. The light materials separated after the initial shredding operation are then directly combind with the dewatered organic residue from the pulping operation to effect further reduction in the moisture content of the resultant mixture. The invention is especially applicable to communities where the garbage and trash are collected separately, with the lights produced by shredding and air classifying the trash being added to the fuel product produced by pulping the garbage.

9 Claims, 2 Drawing Figures

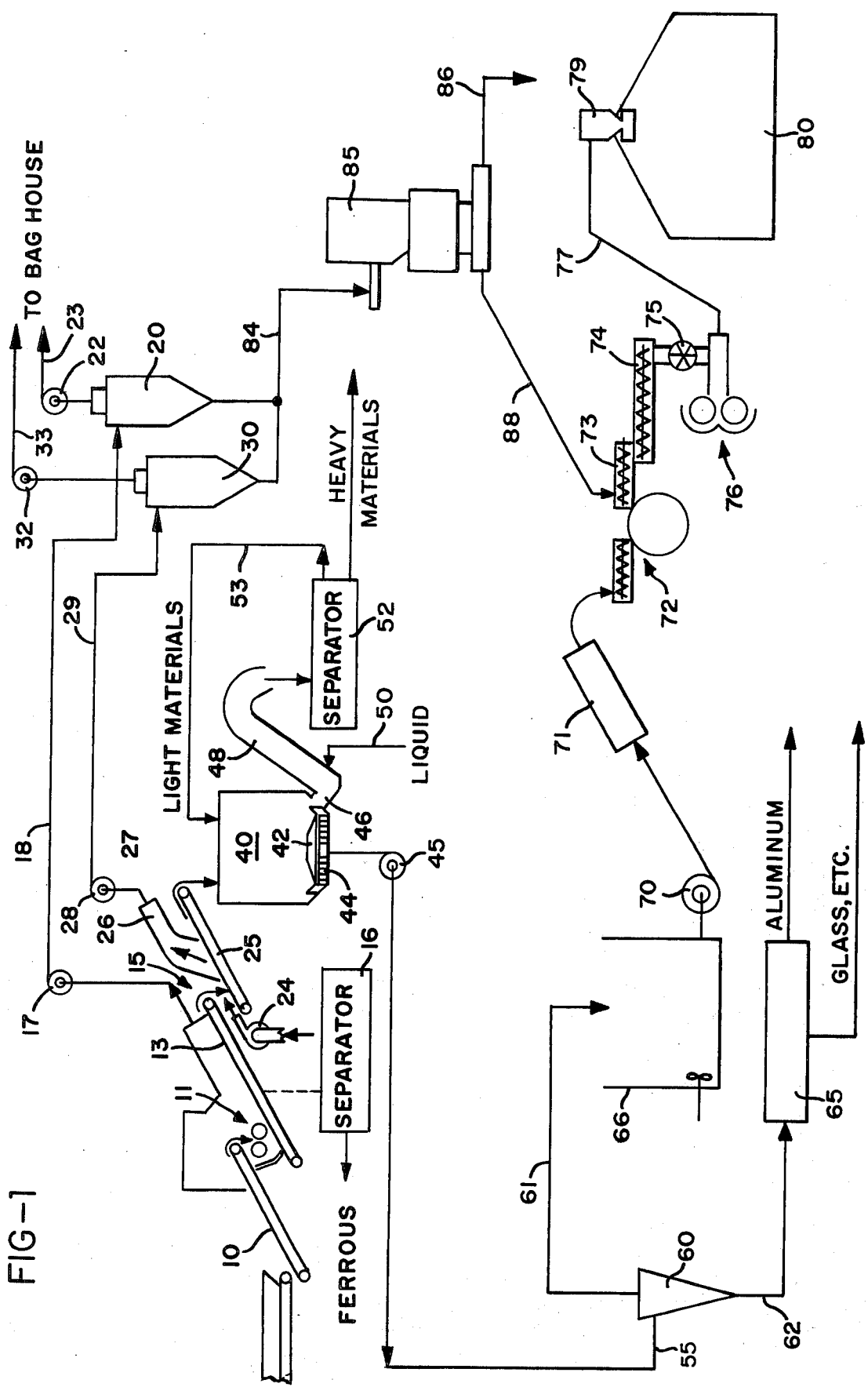

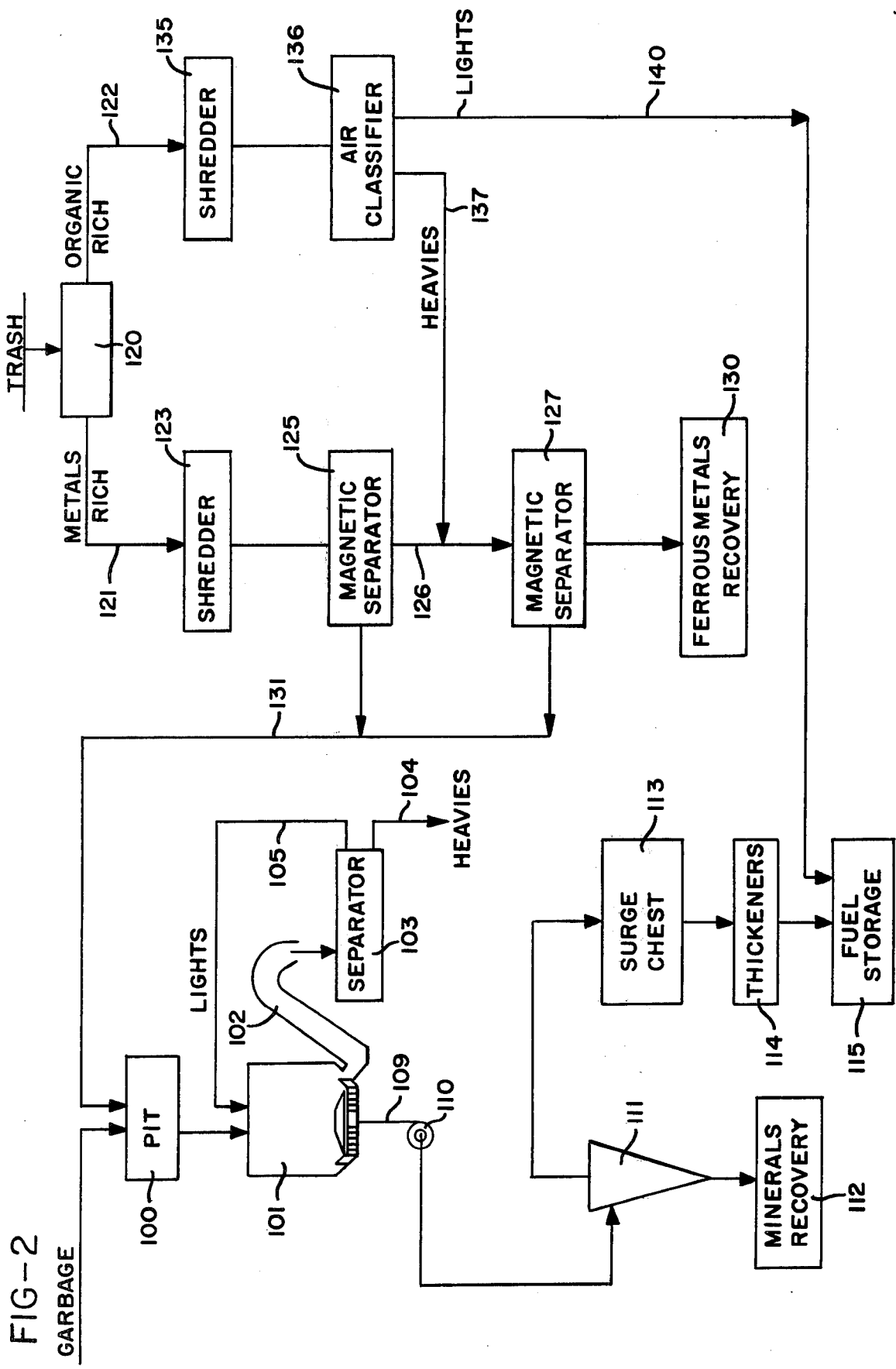

PROCESS FOR PRODUCING FUEL FROM SOLID WASTE

CROSS REFERENCES TO RELATED APPLICATIONS

This application relates to an improvement of the processes and products disclosed in Marsh application Ser. No. 456,041 filed Apr. 1, 1974 as a division of Ser. No. 203,295, which issued Aug. 20, 1974 as U.S. Pat. No. 3,830,636 and has subsequently been reissued as U.S. Pat. No. Re. 55,761. Cross reference is also made to Marsh application Ser. No. 685,784 filed May 13, 1976 as a continuation-in-part of Ser. No. 456,041 and now U.S. Pat. No. 4,049,391 issued Sept. 20, 1977.

BACKGROUND OF THE INVENTION

This invention relates generally to the recovery of materials from refuse, and specifically to a process for treating refuse to obtain fuel therefrom.

Solid waste materials of the type typified by municipal waste have traditionally presented problems of disposal which have become increasingly critical in recent years as a result of not only a rapidly increasing population but the compounding difficulty of a drastic increase in per capita production of solid waste. Conventionally, such solid waste has been disposed of by such means as incineration and landfill. Obviously with the ever increasing concern with problems of natural resources and the dwindling supply of acreage suitable for landfill operations within a reasonable distance of population centers, both of these methods of solid waste disposal have become less acceptable.

Proposals have been made from time to time for processing solid waste materials in such manner that various components thereof can be reused, and processes and systems have been recently developed which have proved successful in recovering for reuse the mineral components, including glass, of municipal solid waste — in accordance particularly with one or more of Marsh U.S. Pat. Nos. 3,720,380, 3,945,575 and 3,970,254. Success has also been achieved in the recovery for reuse of paper making fiber from municipal solid waste — in accordance with Marsh U.S. Pat. No. 3,736,223. In every case, however, there remains a substantial volume of organic materials which must be disposed of, and the primary treatments for disposal are landfill and burning.

Landfill operations are usually complicated by problems of both distance, as noted above, and especially bulk. This tends to make burning the preferred alternate, and since burning necessarily results in the generation of heat, efforts have been made to use municipal waste as a source of fuel, as contrasted to merely incinerating it, because it contains a large amount of combustible materials. Generally, such efforts proved troublesome because the energy output of the waste was inconsistent due to lack of uniformity of the fuel content of the waste materials and the presence of incombustibles such as inorganic materials and the like. The lack of uniformity of the fuel content was due to lack of adequate mixing of the materials, and resulted in wide fluctuations of the heat content, low efficiency, and high ash.

Efforts have been made to concentrate the combustibles by processing the waste material prior to its use as fuel, such as by shredding and air-classifying the municipal waste to sort out the heavy inorganic materials and retain the lighter combustibles. But the lack of uniformity of the combustibles content remained as a problem in terms of consistent energy output because the waste could not be mixed and still be able to be air classified. Also, the separation step has the consequence that a certain amount of the combustible material is wasted. Further, the inorganic materials were subsequently disposed of by dumping and landfilling.

Marsh U.S. Pat. No. 3,830,636 teaches that the consistency and uniformity of the recovered combustible organic materials are substantially improved by wet processing the entire mass of solid waste materials, and such treatment also promotes the recovery of the inorganic materials. The wet processing reduces the size of the combustible organic materials and allows for better mixed and concentrated fuel. Also, the wet processing is gentler to inorganics such as glass and promotes their recovery. But the fuel recovered by a wet process contains a relatively large amount of moisture, and while it is practicable to reduce the moisture by mechanical pressing to about 50%, reduction below that amount generally requires additional energy consuming processing steps, such as drying, which decreases the overall thermal value of the fuel.

SUMMARY OF THE INVENTION

The present invention provides a process for treating solid waste material or refuse to recover the fuel therefrom, and also to recover the reusable ferrous and non-ferrous metals and glass therein, which proves has special advantages in localities where the solid waste has high bulk characteristics, due to large quantities of bulky organic materials, particularly of agricultural origin. The process of the present invention results in maximum separation from municipal refuse of the combustible organics useful for fuel, and in recovery of the combustibles in the form of fuel which has a lower moisture content than any previously available wet process and which is more uniform in combustible solids content, than can be obtained by any known dry process.

In the preferred practice of the invention, municipal refuse is first treated by dry shredding into pieces of a size sufficiently small for further processing, and the shredded refuse is then separated by air classification into a light fraction, which is predominantly paper, and a heavy fraction comprising the majority of the inorganics and the balance of the inorganics other than paper. It has been found practical to separate approximately 30–60% of the total waste as the light fraction, which will have a moisture content in the range of 10–30% and the following approximate percentages of dry components.

Paper: 80–90%
Plastic: 5–10%
Rags: 1–2%
Miscellaneous Dirt: 2–5%

The heavy fraction can be processed essentially as described in one or more of Marsh U.S. Pat. No. 3,720,380, 3,830,636, 3,945,575 and 3,970,254, to effect separate recovery of the ferrous metals, non-ferrous metals and glass, and to recover the residue as a particulate mass with a moisture content of the order of 50%. The light fraction from the air classifier is then mixed with the dewatered residue of the heavy fraction to produce a particulate mass of a sufficiently lower moisture content, e.g. 25–35%, for practical use as fuel without further drying.

This process has the significant advantage that it results in obtaining a substantial fraction of municipal refuse of high B.t.u. value relatively dry, while the heavy fraction is subjected separately to a wet process to separate the other combustible constituents from the incombustibles in such manner as to contribute to their homogenity in their recovered condition. This wet residue can be dewatered to approximately 50% by practical mechanical pressing treatments, and then when the previously separated and relatively dry light fraction is mixed therewith, this results in substantial lowering of the moisture content of the mix without the necessity of dewatering the light fraction of the original charge. In addition, the removal of the light fraction before wet processing facilitates the separate recovery of the inorganic constituents, such particularly as glass and aluminum, from the heavy fraction.

BRIEF DESCRIPTION OF THE DRAWINGS

FIG. 1 is a somewhat schematic fragmentary showing of a system for performing the process of the invention; and FIG. 2 is a similar view showing a modified system in accordance with the invention.

DESCRIPTION OF THE PREFERRED EMBODIMENTS

The refuse is received at a feed conveyor 10 in an unsorted state and fed by conveyor 10 to a shredding apparatus 11 where the refuse is reduced to a size suitable for further processing. The purpose of this operation is primarily to separate the relatively compacted refuse and also to eliminate particularly unwieldy components such as tires, hose, etc. Preferably, the paper and plastic will not be reduced to very small sized pieces, a range of sizes from large postage stamps to pieces 5 or 6 inches square being entirely satisfactory, and excess shredding should be avoided to prevent smearing of the food waste on the paper, and also to minimize embedding of gritty particles in combustible material. An example of suitable commercial shredding apparatus is the Longhorn bar type primary breaker shredder, manufactured by the Longhorn Construction Company, Sulphur Springs, Tex., and shown in Nash U.S. Pat. No. 3,927,840, but other commercially available shredders such as hammermills could be employed equally satisfactorily.

The refuse which has been reduced in size is transported by a conveyor 13 to an air classification apparatus 15. Any recoverable ferrous solids could be conveniently removed at this stage, as indicated diagrammatically at 16; for example, a magnetic drive or separator could be used in conjunction with conveyor 13. As the refuse is reduced in size, the turbulence will free minute size particles, including dust and very small paper pieces, and these particles are withdrawn from the shredder by blower 17 and are passed by a line 18 to a cyclone 20 which has its outlet for lights connected by a blower 22 and line 23 to appropriate dust collecting equipment (not shown).

Air classifier 15 is of conventional construction, and includes a blower 24 for lifting the light pieces of refuse out of the mixed solids on the conveyor 25, and preferably the force of blower 24 should be only enough to separate out the light, and therefore relatively dry, pieces of paper and plastic which normally comprise 30 to 40% of the total waste. The heavy fraction remains on the conveyor 25, while the light fraction is collected by appropriate means such as a hood 26 connected to the low pressure or inlet line 27 of a blower 28, whence it is delivered by line 29 to a cyclone 30 which separates the dust and other light particles of minimal recoverable value, from the pieces of paper and plastic. The lights from cyclone 30 pass to a blower 32 and thence by line 33 to the same dust collecting station ("bag house") as the line 23 from blower 22.

The heavy fraction separated at the air separator 15 includes the heavy inorganics, as well as the heavier plastics, paper contaminated by grease and/or food waste, rags and plastics. These heavies are delivered by the conveyor 25 to a treatment vessel 40, which is preferably a pulper of the construction shown in Blakley et al. Pat. No. 3,595,488, and which includes a rotor 42 operating in conjunction with a perforate bed plate 44. The perforations in the bed plate 44 are generally of uniform size in a range from ½ inch to 1½ inches in diameter, and the frangible solids are mixed with water in the pulper and reduced by the mechanical and hydraulic shear forces created by the rotor, to particle sizes small enough to pass through the perforations in the bed plate 44, and thence to the inlet side of a pump 45.

A second outlet 46 from the pulper 40 connects downwardly with a junk remover 48 for the removal of the infrangible solids, such particularly as the majority of the ferrous metal pieces. Water is continually added to the pulper 40 at a sufficient rate to maintain the contents of the pulper at a suitable consistency for pulping, e.g. 6% solids. As indicated at 50, the water is supplied through the bottom of the junk remover in counter-current flow to the gravity-induced movement of solids through outlet 46 to wash relatively high solids back into the pulper. The junk remover 48 incorporates conveying means, as shown in U.S. Pat. No. 3,549,092, for carrying such solids upwardly for dumping to a separator 52 where the ferrous metal pieces are separated, e.g. by magnetic means, from whatever other materials have been discharged through the junk remover, and these separated materials are returned to the pulper for further comminution, as indicated by the line 53.

The material extracted through the bed plate 44 of pulper 40 will comprise primarily particles of aluminum and other non-ferrous metals, glass, miscellaneous inorganics such as ceramics, stones and the like, and the organic components which were not removed with the light fracion at the air classification station.

The major part of these organics will still be the paper and plastic products, namely those pieces of paper and plastic which were too heavy for air separation at station 15, particularly greasy paper, paper board of all kinds, molded pulp products, and plastic other than sheet such particularly as bottles and other molded plastic products. Generally, the paper and the plastic content will approximately match the dry weight of the paper and plastic fraction separated out at station 15, and there will in addition be substantial quantities of garbage, vegetation and other organics.

The slurry extracted through the bed plate 44 is delivered by the pump 45 to the inlet line 55 of a cyclone cleaner 60, which separates the solids into the predominantly organic lights discharged to the line 61 and the predominantly inorganic heavies discharged to the line 62. The heavies can be separated into glass, aluminum, other nonferrous metals, and ceramics and the like in accordance with one or more of the Marsh patents noted above, as indicated by the processing station 65.

The organics from line 61 are preferably treated in accordance with Marsh U.S. Pat. No. 3,830,636 to produce a particulate mass suitable for use as fuel or other purposes. This treatment comprises accumulation in a surge tank 66 of sufficient size to promote homogenity, and from which it is withdrawn by a pump 70 for mechanical dewatering sufficient to reduce the moisture content of the mass to approximately 50%, as is represented in the drawing by an inclined screw press 71 followed by a cone press 72. Since the material to be dewatered includes only about one-half of the fibrous materials in the refuse as a whole, it is relatively easily dewatered to the desired extent by mechanical pressing.

The solids discharge conveyor 73 of the cone press connects with a second screw conveyor 74 which feeds the mass to a rotary valve 75 forming the inlet of an air conveyor comprising a blower 76 and pipeline 77. The output end of the line 77 leads to an air cyclone 79 mounted in the top of a bin 80 to separate the conveying air from the conveyed solids and to deliver the latter to the interior of the bin for subsequent use as fuel.

The predominantly paper and plastic fraction which is separated out in air classified 15, and which becomes the heavy fractions discharged from the apex outlets of the cyclones 20 and 30, is delivered by a common discharge line 84 from the cyclones to a secondary shredder 85 of suitable conventional construction capable of reducing the paper and plastic to pieces of an acceptably small size range comparable to the paper and plastic pieces extracted through the bed plate 44 of pulper 40, i.e. capable of passing through holes $\frac{1}{2}$ to $1\frac{1}{2}$ inches in diameter. Preferably, the shredder 85 will include some form of screening for separating out the majority of the dust and dirt particles which are detached from the paper and plastic on shredding process, as indicated by the discharge line 86.

The shredded paper and plastic from shredder 85 are conveyed by its main discharge line 88 to the discharge conveyor 73 of the cone press 72 for mixing with the dewatered solids from the cone press. If the conveyors 73 and 74 are operated only partially full, the relatively dry paper and plastic particles from the shredder 85 will be mixed with the discharge from the press with sufficient intimacy to effect substantial homogeneity in the particulate product delivered to the rotary valve 75, and additional mixing will take place during travel of the mixed material through the pipeline 77 and cyclone 79 into the bin 80.

Other conventional mixing means could be used, so long as it is of a suitable construction to achieve the desired thorough mixing of the 50% solids discharged from the cone press with the shredded paper and plastic of low moisture content, namely of the order of 15%. Since this dry material is approximately equal in dry weight to the solids in the output from the cone press, mixing of the two products will correspondingly reduce the moisture content of the combined product to a value, e.g. 25–35%, which is readily burned and more efficient as a fuel than the 50% mixture from the cone press 72 by itself.

Not only is the fuel produced by the process of the inveniton of materially improved quality and utility than previously available, but the invention offers other practical advantages over prior approaches including that of Marsh U.S. Pat. No. 3,830,636. More specifically, the capital cost of the equipment may be reduced, both for the pulper 40 because it is required to handle less bulk than if the entire charge of unsorted solid waste were delivered thereto, and also for the dewatering apparatus, since it too is required to handle only approximately $\frac{1}{2}$ as much fiber content. Further, the maximum quantity of organic material is made available for use as fuel in an efficient form, and also that fuel will include a minimum of inorganics, with resulting lower ash content, because the reduced volume of fiber in the slurry extracted from the pulper 40 facilitates a higher degree of segregation of the inorganics. Finally, the fact that only about half of the fibrous content of the end product requires dewatering promotes the production of dryer fuel at lower cost.

FIG. 2 illustrates a modified system in accordance with the invention which is especially designed for handling solid waste in a community which requires householders to segregate their garbage and trash for separate collection, and it also has special applicability to communities where the trash has a high proportion of vegetation, such as grass clippings, leaves, tree branches and the like.

In the system of FIG. 2, the garbage is treated in essentially the same manner as the heavy materials in the system of FIG. 1. The collection trucks dump directly into a pit 100 from which the garbage is fed into a pulper 101 of the same characteristics as the pulper 40 in FIG. 1 and similarly equipped with a junk remover 102 dumping into a separator 103 which removes the ferrous metals at 104 and returns the lights by line 105 to the pulper 101.

The slurry extracted from the pulper 101 by line 109 is supplied by a pump 110 to a cyclone cleaner 111 from which the heavies are delivered to a minerals recovery system 112 such as described in connection with station 65 in FIG. 1. The lights pass from cleaner 111 to a surge chest 113, thickeners 114 and fuel storage bin 115.

The trash fraction of the solid waste which is collected separately from the garbage is preferably first delivered to a station 120, such as a conveyor, where it can be sorted into a metals rich fraction 121 and an organics rich fraction 122, for example by means of a manually controlled cherry picker or the like. The metals rich fraction is delivered to a shredder 123 from which the output goes to a first magnetic separator 125. The heavies sorted out by the magnetic separator 125 are delivered by line 126 to a second magnetic separator 127 which in turn delivers the separated heavies to a ferrous metals recovery station 130. The non-magnetic materials separated by each of magnetic separators 125 and 127 are delivered to a line 131 by which they are transported to the same pit 100 to which the garbage is initially delivered.

The organics rich fraction from the station 120 is also delivered to a shredder 135 the output of which is delivered to an air classifier 136, which may be of the same construction as the air classifier 15 in FIG. 1. The heavies from the air classifier 136 are delivered by a line 137 to the line 127 connecting the magnetic separators 126 and 128, so that any non-magnetic materials entrained therewith will be separated out at the magnetic separator 128 and delivered to the line leading back to the pit 100. The lights from the air classifier 136 are taken directly by a line 140 to the fuel storage bin 115 for mixing with the fuel delivered thereto from the thickeners 114.

It will accordingly be seen that the system and process illustrated by FIG. 2 provide the same advantages as those illustrated in FIG. 1, in that the fraction which initially contains the largest proportion of combustible light materials is treated while dry to separate out the dry combustible lights prior to wet pulping the heavy organic fraction. Then when these dry materials are delivered directly to the storage bin for mixture with the dewatered organic residue from the wet treatment line, they enhance the fuel properties of the resulting mixture by correspondingly reducing its average moisture content while adding substantial B.t.u. value thereto.

While the process herein described constitutes preferred embodiments of the invention, it is to be understood that the invention is not limited to this precise process, and that changes may be made therein without departing from the scope of the invention.

What is claimed is:

1. A process for recovering fuel, as well as other reusable materials, from municipal solid waste which includes paper and other fibrous materials, non-fibrous organic materials, metal, glass and other inorganic materials comprising:
   a. dry shredding the waste to pieces of a range of predetermined sizes,
   b. separating said shredded refuse by air classification into a light fraction which is predominantly paper and a heavy fraction,
   c. treating said heavy fraction to reduce the relatively frangible portions thereof to less than a predetermined particle size by subjecting said heavy fraction in the presence of a liquid to substantial and violent mechanical and hydraulic shear to form a slurry,
   d. separating the inorganics in said slurry from the organic material therein,
   e. dewatering said organic material to a particulate mass, and
   f. combining said particulate mass with said light fraction for use as fuel.

2. A process as defined in claim 1 wherein said particulate mass is dewatered to a moisture content of the order of 50%, and wherein said air classification is so controlled that said light fraction has a moisture content of less than 20%.

3. A process as defined in claim 1 including the step of further shredding said light fraction prior to said step of combining with said dewatered organic material.

4. A process as defined in claim 3 wherein said particle size in said slurry is established by extraction of said slurry through perforations of the order of ½ to 1½ inches in diameter, and wherein said further shredding step is carried out to the extent of reducing said pieces to the same size range as said particle size in said slurry.

5. A process as defined in claim 1 wherein said light fraction comprises between about 30 and 40% by weight of the total refuse.

6. A process as defined in claim 1 wherein said particle size in said slurry is established by extraction of said slurry through perforations of the order of ½ to 1½ inches in diameter.

7. A process as defined in claim 1 which includes the step of separating the waste into a metals-rich fraction and an organics-rich fraction prior to carrying out said steps (a) through (f) on said organics-rich fraction, and which also includes the steps of dry shredding said metals-rich fraction, removing the various metal constituents of said shredded metals-rich fraction, and combining the remainder of said fraction with said heavy fraction of said organics-rich fraction prior to said step (c).

8. A process as defined in claim 1 wherein the solid waste is initially separated into a garbage fraction and a trash fraction, wherein the various metal constituents are removed from said trash fraction prior to carrying out said steps (a) through (f) on said trash fraction, and wherein said garbage fraction and said heavy fraction of said trash fraction are combined prior to said step (c).

9. A process as defined in claim 1 wherein the solid waste is initially separated into a garbage fraction and a trash fraction, wherein the trash fraction is further separated into a metals-rich fraction and an organics-rich fraction, wherein said organics-rich fraction is subjected to said steps (a) through (f), wherein said metals-rich fraction is subjected to dry shredding followed by removal of the various metal constituents thereof, and wherein said garbage fraction and the remainder of said metals-rich fraction are combined with said heavy fraction of said trash fraction prior to said step (c).

* * * * *